United States Patent
Le Strat et al.

[15] 3,651,269
[45] Mar. 21, 1972

[54] ACCOUNTING SYSTEM FOR TELEPHONE EXCHANGES

[72] Inventors: Guy Jean Le Strat, Meudon; Michel Bradane, Lannion, both of France

[73] Assignee: International Standard Electric Corporation, New York, N.Y.

[22] Filed: Dec. 4, 1969

[21] Appl. No.: 882,044

[52] U.S. Cl. ..............................179/7 R, 179/7.1 R, 179/8 R
[51] Int. Cl. ..............................H04m 15/00
[58] Field of Search ..............................179/7 MM, 7.1, 7 R, 8

[56] References Cited

UNITED STATES PATENTS

| | | | |
|---|---|---|---|
| 3,160,709 | 12/1964 | Burke | 179/7 MM |
| 3,001,021 | 9/1961 | Wright et al. | 179/7 MM |
| 3,342,939 | 9/1967 | Gattner et al. | 179/7.1 |

*Primary Examiner*—Kathleen H. Claffy
*Assistant Examiner*—Tom D'Amico
*Attorney*—C. Cornell Remsen, Jr., Walter J. Baum, Percy P. Lantzy, J. Warren Whitesel, Delbert P. Warner, James B. Raden and Marvin Chaban

[57] ABSTRACT

Data on telephonic toll communications are recorded in an automatic toll exchange by means of computers and magnetic tape machines instead of by ticketing in the several originating exchanges. Incoming toll junctors in a group are scanned from a computer associated with the groups. A definite cell in the computer's store is allotted to each of the associated junctors to simplify operation and shorten recurrent cycles. Initial data on an incoming call is transferred from the register which serves the call to the computer. When the release of a junctor is stated, final data in its allotted cell is transferred to the recording machine. The charges can be computed in a later handling of the records, in an accounting office.

4 Claims, 4 Drawing Figures

INVENTORS

G. J. Le Strat, M. Bradane

By: D. O. Warner
Attorney

ACCOUNTING SYSTEM FOR TELEPHONE EXCHANGES

The present invention relates to a recording system designed for accounting telecommunications, particularly in automatic telephonic exchanges. It is more specially designed for accounting variable charges (according to the duration, the distance etc.) which are used in toll communications.

A well known mode of charging, used in town exchanges, is to record the number of charge units, due for local communications, on meters which are allotted to the subscribers of the exchange, and to have tickets delivered by operators for toll communications. However, in case the toll communications are automatic, it is necessary to provide for an automatic recording of the variable charges due for such communications. Thus, an automatic recording of the toll charges, as a multiple of said charge units, on the same meters, has been resorted to. This mode of charging suppresses every incident intelligence (day, hour, called location etc.) which was entered by the operators on the tickets so that the administration can no longer give a detailed account of the bills it sends to the subscribers. This disadvantage of charging on meters lead to resort to a "recorded charging", which comprises recording of all useful intelligence regarding the communications, on a common carrier in a business machine, and then suitably analyzing the record.

In a known system, successive part informations regarding all communications are thus recorded "in the stream" on a common carrier, each time with a reference which will identify the respective communications. The common record which is thus obtained must then be sorted in order to group together all informations regarding each communication.

The recorded charging system according to the invention is provided for its being used in an automatic exchange which comprises, (i) incoming circuits having means for showing the characteristic conditions of the communications (such as busy condition, running communication etc.), (ii) registers which connect themselves to the calling incoming circuits to serve the communications wanted, and which have means for storing the initial informations regarding these communications (such as identity and class-of-service of the calling subscriber and identity of the called one), (iii) suitably programmed data processing machines, each associated with a plurality of incoming circuits and having means for a cyclic scanning of these circuits as regards their indications, and (iv) a transfer device whereby said initial informations can be transferred from a register linked to a given incoming circuit, to a processing machine associated with same.

This system can be featured in this that each processing machine comprises, (a) a memory cell allotted to each of the associated incoming circuits, (b) means for entering the initial informations transferred from the register and the successive (part) informations derived from the indications received from each incoming circuit, into the cell allotted to this circuit, in the time slots when the machine reaches this circuit during its scanning cycle, and (c) means for transferring the final informations regarding the terminated communications, from the respective cells, to a recording business machine.

The system according to the invention is more particularly designed for charging toll communications called by the subscribers of a network served by an automatic toll exchange. According to a feature of the invention, the means stated hereinabove are arranged in this toll exchange, so that a centralized charging of these communications for all subscribers of the network served, is achieved.

According to another feature of the invention, the data processing machines are provided, beside the set of cells, stated under (a) for storing the informations referred with to, (d) a second set of cells allotted to the associated incoming circuits, (e) means adapted to enter into these cells only the last indications got from the scanned incoming circuits, (f) means for scanning said second set of cells along with the associated incoming circuits, (g) means for comparing each time the indications (just) received from an incoming circuit with the preceding indications read out of the associated cell, and (h) means for processing again the informations stored in the associated cell of the first said set, only responsive to a difference stated between the two said indications.

According to a further feature of the invention, each incoming circuit is associated only to one processing machine; the transfer device comprises connection means such that only one register at a time can seize this device; means are provided whereby a register which has been connected to a calling incoming circuit, has stored the above mentioned initial informations and has seized the transfer device, is adapted to apply to said circuit (namely, through the path of its connection with this circuit) a charge request signal adapted to be received by the processing machine when it reaches this circuit during the scanning cycle; and the processing machines are provided with means for causing the initial informations transmitted from said register through the transfer device, to be entered into the store cell associated with said circuit, responsive to said signal; said signal being removed by the register, and the transfer device being released thereby, responsive to the transfer of the initial informations being achieved.

According to a further feature of the invention, the transfer device comprises two transfer channels and connection means such that two registers at a time can seize, one channel each; the registers are provided with means for applying two distinct charge request signals, respectively assigned to the two channels; and the processing machines are provided with means for entering the initial informations transmitted through the channel that has been seized by the register connected to a scanned incoming circuit, into the store cell associated with this circuit, responsive to the charge request signal assigned to that channel, received through said incoming circuit.

It should be understood that the store cells in the processing machines being allotted to the associated incoming circuits is a definite allotment. This definite allotment, which features the invention, spares means and operations that would have to allot every time another free cell to a calling incoming circuit and to find this allotment again each time machine would reach a circuit in way of being charged. Owing to this definite allotment, the processing machines are simplified, which results in their better real-time operation.

Processing of the informations stored in the store cells includes namely writing in the hour of beginning and ending the communications by reference to a clock. The number of the junctor can be taken from that of the associated cell and transferred to the recording machine along with the other informations regarding the communications being charged. The duration of the communications and the charges can be computed by the same processing machines and also transferred to the recording machine. However, in order to simplify the real-time operation and shorten the scanning cycles, such computation can be deferred to machines which will analyze the common records so as to make up the subscribers' accounts.

The invention can be further stated as providing a central electronic system for charging telephonic communications in an automatic toll exchange, and which peruses, on the one hand, the incoming junctors and the registers in this exchange and, on the other hand, a plurality of data processing machines operating in real time, these machines being provided with means for scanning the junctors as to the condition of the communications, and store cells adapted to contain at least the initial informations (identity of the communication and hour of beginning); the number of such cells in each machine, multiplied by the number of said machines, being not less than the number of junctors; this system being characterized in this that each cell is allotted to a junctor, so that each processing machine is associated with as many junctors as there are cells therein; that the registers are provided with means for registering the full identity of a communication (caller's identity and class-of-service, called subscriber's identity); that a transfer bus which has access to inlet registers in all said machines, and a switch adapted to connect any register, but only one at a time, to said bus, is provided for transferring the said informations to the processing machines; that the registers comprise means in each of them, which state when the said switch has connected that register to the said bus, and which marks thereupon a wire in the preselection connection from that register to the junctor connected thereto, this wire being extended through the junctor so that it can be reached through scanning by the processing machine associated with this junctor; that the said machines are provided with further means for transferring the said informations from the registers and through the transfer bus, into their inlet registers and then into their cells allotted to the junctors scanned, when the machine states that the said wire is marked by the register; and that said machines are provided with still further means for handling the informations stored in the cells, according to the condition of the communication as tested in the junctors scanned, and namely for writing in the beginning and ending hour of the communication, and with means for transferring the final informations regarding the terminated communications, from the respective cells into a peripheral recording business machine.

The invention will be described more particularly as applied to a toll exchange, with reference to the appended drawings wherein.

Figure 1:
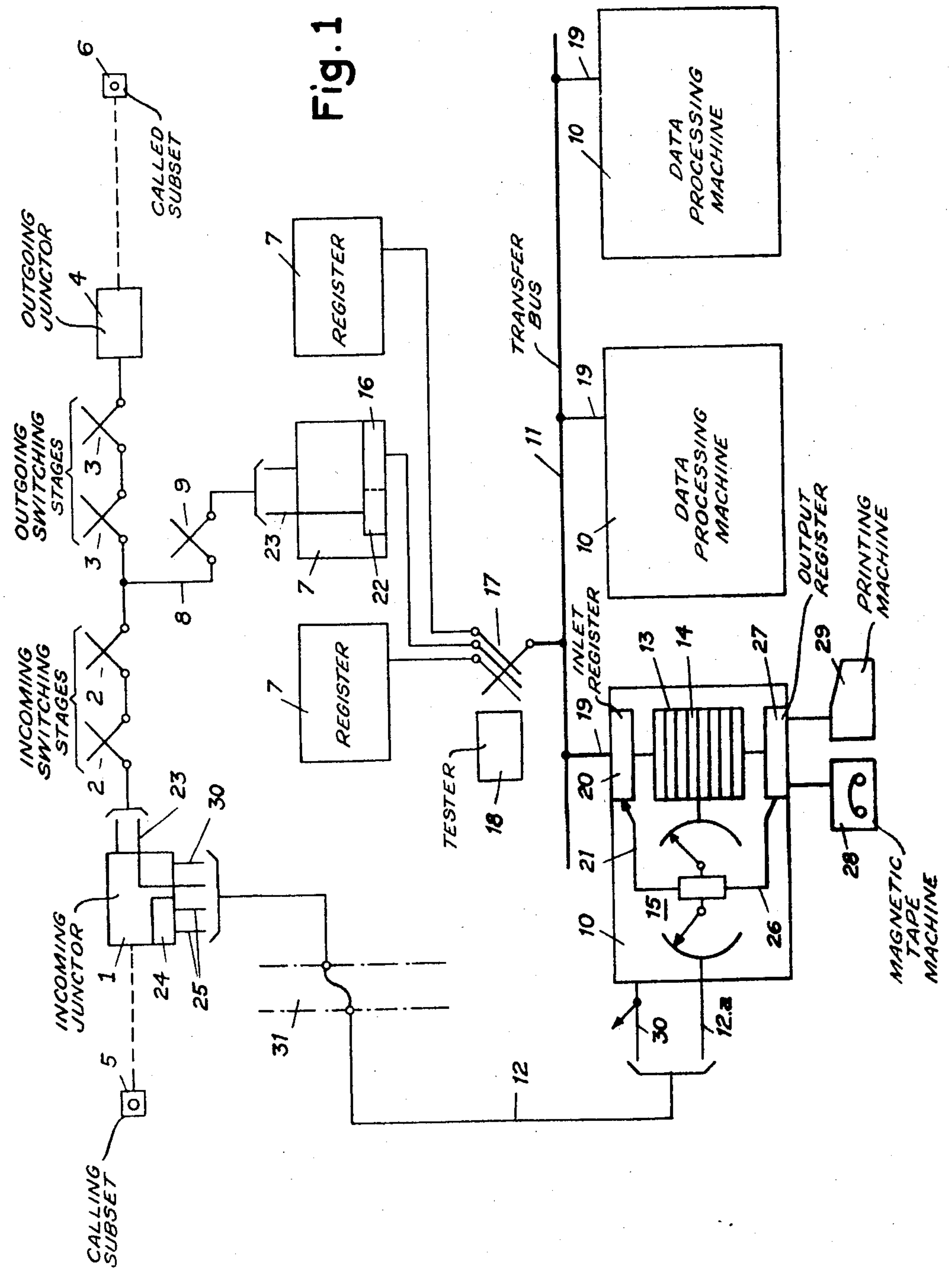
FIG. 1 is a junction diagram showing a telephonic exchange equipped in accordance with the invention.

It will be assumed that the toll exchange shown in FIG. 1 is an originating exchange for an area of exploitation wherein the subscribers (they will be callers herein) are linked to a network of town exchanges. The exchange shown comprises, in its switching chain, incoming junctors 1, incoming switching stages such as 2, 2, outgoing switching stages such as 3, 3 and outgoing junctors 4. The calling subsets 5 will be connected for their toll communications to incoming junctors 1, and the outgoing junctors 4 route the communication towards the called sets 6 located in another area of exploitation. Routing is controlled by registers 7 which are to be connected to incoming junctors 1 through a preselection chain which comprises here switches 2, a branch connection 8 and a switching stage 9.

In view of the recorded charging, the exchange comprises data processing machines 10 which are suitably programmed. These machines will receive all useful informations on the communications called for, on the one hand, by transfer of initial informations stored in the registers, by means of a transfer bus 11, and on the other hand, by a cyclic scanning of the incoming junctors through a scanning bundle 12. The junctors will supply intelligence on the successive conditions of the communications. Each of these machines is associated with a group of junctors, and each group of junctors is associated with a single processing machine. Informations regarding the communications are noticed in each machine, in a store 13 which has as many cells 14 as there are junctors associated with this machine, each cell being allotted to a junctor. A cyclic scanning device 15 scans cells 14 in synchronism with junctors 1 (through their groups of wires 12a). Informations will be noticed in the cell allotted to a junctor, modified, completed or processed, in the recurrent time slots when a junctor and its corresponding cell will be reached during the scanning cycles.

The registers notice the initial informations by means diagrammatically shown in 16. These informations must define the communication for the purpose of charging and comprise namely caller's identity and class-of-service, called subscriber's identity and, if wanted, the rate to be applied. The number of the junctor need not be noticed in view of its transfer to the processing machine, since informations regarding a communication called for by a given junctor will be transferred to the store cell 14 that is allotted to this junctor, in the time slot where this junctor will be reached by the cyclic scanning device as well as the cell allotted to it.

Each register, and only one at a time, can be connected to the transfer bus 11 by means of a switch or "coupler" 17 which is controlled by device 18, or "tester", of a known type and adapted to receive calls from the registers, check the free condition of bus 11 and connect to the bus a calling register, proceeding to a selection in case there are several calling registers. Transfer bus 11 is multipled onto processing machines 10 through branches 19 which are connected to inlet registers 20 in these machines. Writing in of the informations transferred into the respective cells is controlled by scanning device 15, by means of a control link 21.

That register which has noticed the initial informations and seized the transfer bus states this condition by means 22 therein, which means then apply a charging request marking onto a wire 23 which leads to the junctor through the preselection connection. This wire simply goes through the junctor and is then comprised in the group of wires 12a that is scanned by device 15. When the scanning device in one of the processing machines reaches the junctor wherein the charging request wire 23 is so marked, that device controls, by the control link 21, the transfer of the initial informations from transfer bus 11 to that cell 14 which is allotted to this junctor.

The following informations regarding the communication called for will be received from the junctor by the scanning device. To this end, the junctor comprises means of a known kind, diagrammatically shown in 24, which notice the condition of the communication and signal them to the scanning device in marking wires 25 in the group 12a. In fact, these conditions are but three: junctor free, junctor busy, communication set up (or running), and they are signalled on two wires 25. When the processing machine finds again a signal "junctor free" after a running communication was noticed in cell 14, it orders, by an order link 26, a transfer of the final informations regarding this communication, through output register 27, to a recording machine such as a magnetic tape machine 28 and, for some classes of callers (such as hotels), to a printing machine 29 which delivers at once tickets for such callers. In view of this transfer, the processing machine completes the informations as contained in the cell with any further wanted informations for accounting the cost of the communication, namely the hour of the end and, if desired, the duration and even the figure, although computation of the last said informations can be resorted to a machine which will sort the magnetic tape, or to an operator which will make up the ticket.

When a processing machine 10 is in a failure condition, it marks a wire 30 which is multipled onto branch wires included in all groups 12a towards the associated junctors. All these junctors are thus marked by said wire as non-available.

It can be assumed that transfer of the initial informations from registers to processing machines will be achieved by parallel binary marking on the wires of the transfer bus.

The junctors are grouped for their association with the processing machines by means of a distributing frame 31 through which the scanning bundles 12 are lead.

In a large exchange where the junctors are divided into large groups associated respectively with several groups of registers, each of such large groups will be provided with a separate group of processing machines and a separate transfer bus. In each said large group, the operation will be the same as that which has been described hereinabove. However, and if necessary, two groups of registers can be served by a single transfer bus.

The data processing machines can be general-purpose digital computers having a recorded program and operating in real time. They will be suitably programmed for the purpose of charging, in a way that resorts to the artsman.

In an embodiment, the informations contained in a store cell are:

the processing step (four steps are foreseen)

the initial informations transferred from the register, viz.:

the caller's full number the caller's class of service
the called subscriber's full number
the rate to be charged
the hour of the beginning of the communication (set in by the machine).

The hour of the end of the communication (and, should it be wanted, the duration and even the figure will be added by the machine when it will operate the transfer to the recording machine.

The following phases are foreseen:

| Standing phase | Signalling wires (25, fig. 1) | Request wire (23, fig. 1) | Next phase | Process to be carried out |
|---|---|---|---|---|
| 0 | 0 0 | 0 | 0 | No processing (junctor at rest). |
| 0 | 1 0 | 0 | 0 | No processing (junctor busied). |
| 0 | 1 0 | 1 | 1 | Charging requested: transfer of initial informations; stepping the phase. |
| 1 | 1 0 | 0 | 1 | Waiting the communication: no processing. |
| 1 | 1 1 | 0 | 2 | Communication set up: writing in the hour; stepping the phase. |
| 2 | 1 1 | 0 | 2 | Communication running: no processing. |
| 2 | 1 0 | 0 | 3 | Communication ended: waiting the outlet; stepping the phase. |
| 3 | 0 0 | 0 | 0 | Junctor released: recording the informations (including the hour of the end), stepping the phase back to 0. |

Figure 2:
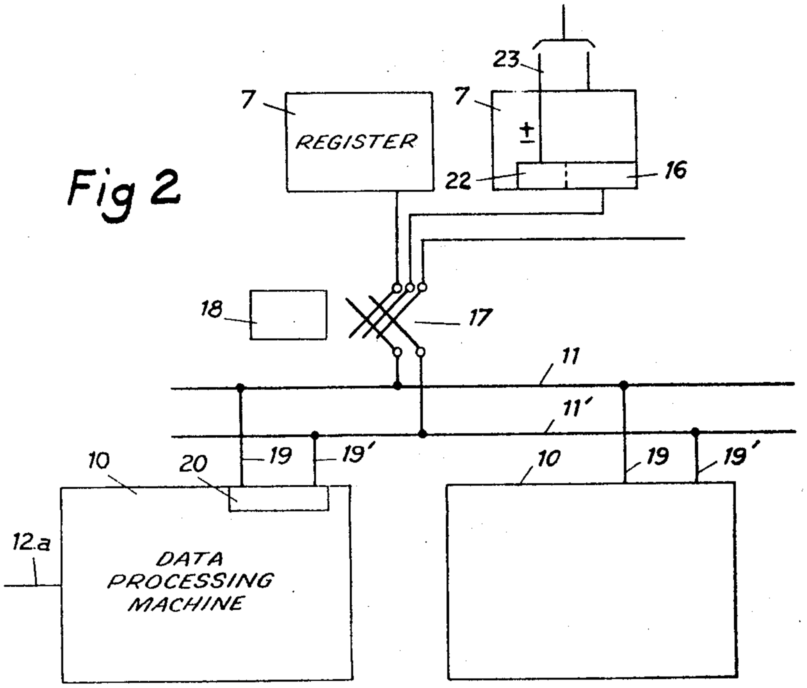
FIG. 2 shows a second transfer bus between the registers and the data processing machines, as a part of the diagram of FIG. 1.

If the traffic is so heavy that it cannot be met by means of a single transfer bus, two such buses can be provided, as shown in FIG. 2. Tester 18 peruses then either of the two randomly, yet the register which is connected to one of the two detects, by means 22 therein, which of the two it is connected to and applies to wire 23 a distinct marking, as the case may be (for instance, it can apply either of two markings of opposite polarities). The processing machine detects in turn the distinct marking and causes initial informations to be transferred to it through that of the two buses the distinctive marking of which it has detected. In the drawing, the two buses and their respective branches are designed by reference numbers 11, 11' and 19, 19', and the two distinct markings that can be set on wire 23 are denoted by signs ± near this wire.

Figure 3:
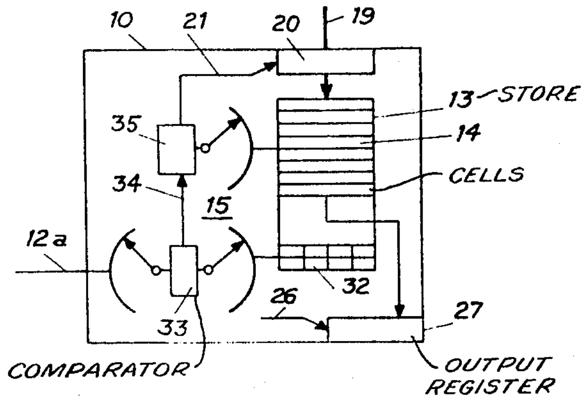
FIG. 3 shows diagrammatically a device for searching and comparing a fresh information and a stored information.

FIG. 3 shows a device which shortens still more the scanning cycle and thus easies the real-time operation of the data processing machines. Store 13 of machine 10 comprises, further to the set of the charging cells 14 allotted to the junctors, condition cells 32, also allotted to the same junctors, but in which only the last preceding intelligence got from the junctors (such as "0 0 0", "0 1 0" etc., see above) will be noticed in its direct form. The scanning operations are divided into two stages. In a first stage, a comparator 33 compares directly the intelligence being received from the junctor through wires 12*a* to the last preceding intelligence therefrom as stored in the cell 32 allotted to this junctor. This operation is carried out steadily on all associated junctors. When the comparison shows no change in the intelligence, the scanning device steps straight to the next junctor. When however the comparison shows a change of condition in the junctor reached, then the comparator sends out, by an order link 34, a processing order to a control device 35. This device will analyze the change and cause the informations to be processed as stated above, in cooperation with the charging cell 14 allotted to this junctor.

Figure 4:
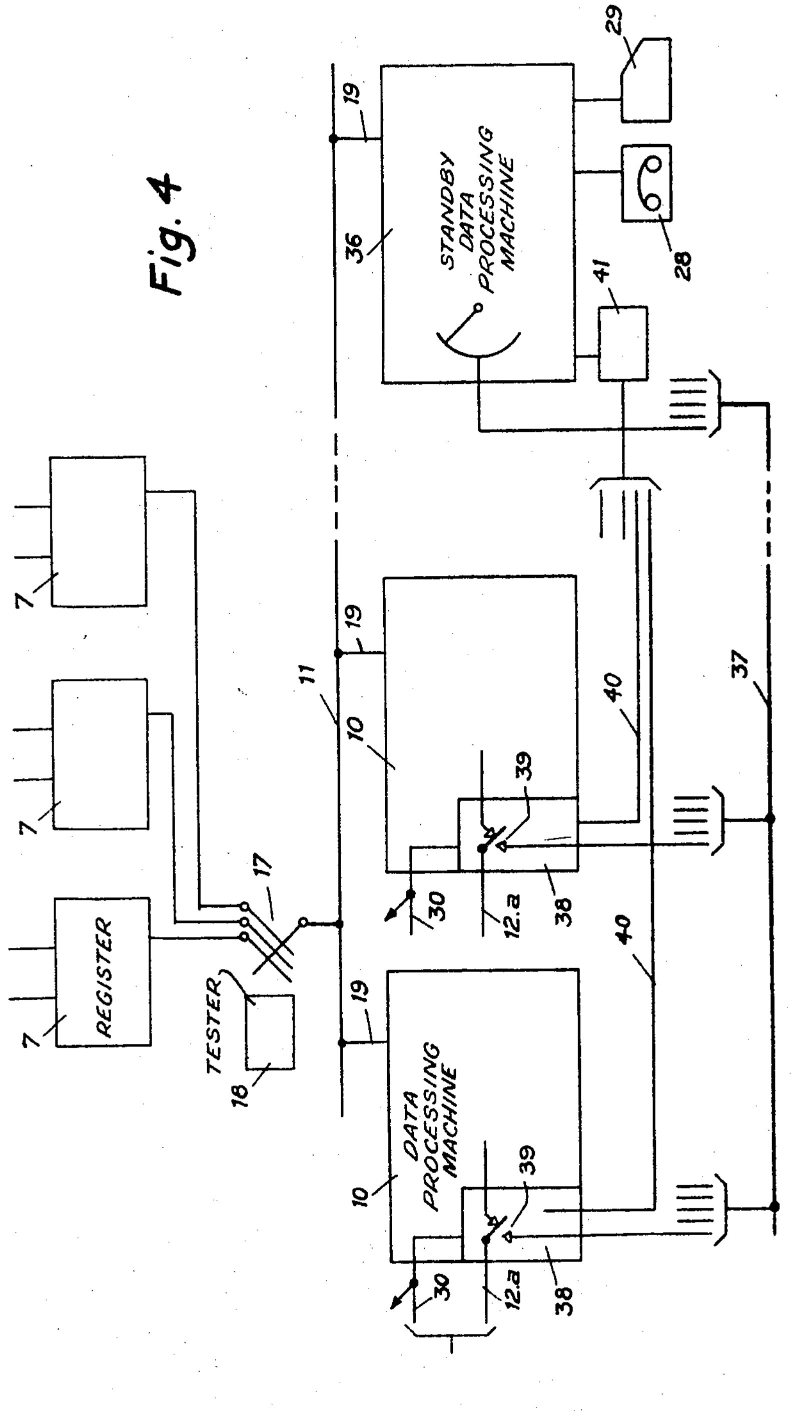
FIG. 4 shows a stand-by data processing machine, as a part of the diagram of FIG. 1.

In order to avoid the condition in which an entire group of junctors become unavailable when a data processing machine is in a failure condition, the invention provides an arrangement wherein a stand-by machine takes up scanning the junctors and charging their communications instead of the failed machine. This arrangement is represented in FIG. 4. The stand-by machine 36 is equipped like the processing machines described above. It is branched on the transfer bus 11 like the other machines, but the wires it scans are those of a link bundle 37 instead of coming from a definite group of junctors. Each machine 10 is supplemented with a link circuit 38 whereby wires 12*a* coming from the associated junctors can be connected to corresponding wires in bundle 37, by means diagrammatically figured as contacts 39. Link circuits 38 are connected by leads 40 to a link tester 41 connected to the stand-by machine 36. When a processing machine fails, it puts an "unavailable"marking on wire 30, as stated above, and a relief call marking on wire 40. Tester 41 accepts the relief call provided the stand-by machine is free and sends out a signal to link circuit 38 by lead 40 (which lead can comprise, in fact more than one wire). Circuit 38 extends wires 12*a* by means of contacts 39 and removes the "unavailable" marking from wire 30. The stand-by machine starts operating to scan the junctors, enter the initial informations from the registers and transfer the charge informations regarding the ended communications to recording machines 28 and 29. In case the stand-by machine would fail in turn, tester 41 would signal this to the processing machine 10 that was relieved, and this machine would apply again the "unavailable" marking to wire 30.

The operation just described can be achieved by means which are well known in the art and need not be described in detail.

Of course, the particular description of the invention as it is shown in the drawings must not be understood as one having a limitative meaning.

We claim:

1. A recording and call information processing system for an automatic telephone exchange comprising a switching network, a plurality of incoming circuits for accessing said network, and at least one register for receiving and storing call information from said incoming circuits for controlling the completion of a path through the switching network, the invention comprising a data storage and processing machine including a transfer control device and information storage means, groups of storage cell sets in said machine, one group of cells being permanently associated with each of said incoming circuits, first and second sets of memory cells in said transfer device, and other memory cells in said storage means, a first said set of cells of the group associated with one incoming circuit responsive to a call indicating condition at said incoming circuit for enabling said other cells of said group for the receipt of information, said register responsive to a call indicating condition from said one incoming circuit for establishing a data storage connection to said other cells of said group, scanning means in said machine responsive to receipt of a change of condition signal from an incoming circuit, said second set of cells in said one group controlled by said scanning means in response to further changes of condition at said incoming circuits to control the transmission of information from the register to one channel associated and for controlling the transmission of stored information from the machine to a further recording medium.

2. A system as claimed in claim 1, in which there are means adapted to enter into said second set of cells only the signals last received from the scanned incoming circuits, means for scanning this second set of cells along with the associated incoming circuits, means for comparing each time the signals being received from an incoming circuit with the last preceding signals stored in the associated cell, and means for processing the information stored in the associated cell of the first said set, only responsive to a difference stated between the two said signals.

3. A system as claimed in claim 1, in which the transfer device comprises two transfer groups of cells and connection means such that two registers at a time can seize one group of cells each; the registers being provided with means for transmitting two distinct charge request signals to the incoming circuit, each assigned to a cell set in the transfer control device; and the processing machines are provided with means for causing the initial information transmitted through the group of cells that has been seized by the register connected to said circuit, to be entered into the memory cell allotted to the incoming circuit scanned, responsive to the charge request signal assigned to that group of cells, received through said incoming circuit.

4. A system as claimed in claim 1, in which there are a plurality of machines, each group of cells is allotted to an incoming circuit, so that each machine is associated with as many incoming circuits as it has groups of cells therein; the registers are provided with means for registering the full identifying information of a communication; a transfer bus which has access to the inlet in all said machines, and a switch adapted to connect any register, but only one at a time, to said bus, are provided for the transfer of said information to the processing machines; means in each register emitting a signal when said switch has connected that register to the said bus for marking thereupon a wire in a preselection connection from that register to the inlet circuit served, this wire being extended through this inlet circuit so that it is accessible to the scanning by the processing machine associated with this inlet circuit, said machines being provided with means for recording the said initial information from the registers and through the transfer bus into their inlet registers and then into their cell groups allotted to the inlet circuits scanned when a machine detects that said wire has been marked by a register; and means in said machines for handling the information stored in the cell groups, according to the condition of the communication as tested in the inlet circuits scanned, for adding the hour of beginning and ending the communication, and with means for transferring the final information regarding the terminated communications, from the cells where this information has been stored, into said further recording medium.

* * * * *